United States Patent

Ross et al.

[11] 4,029,595
[45] June 14, 1977

[54] NOVEL LIQUID CRYSTAL COMPOUNDS AND ELECTRO-OPTIC DEVICES INCORPORATING THEM

[75] Inventors: Daniel Louis Ross, Princeton; Dragan Milan Gavrilovic, Cranbury, both of N.J.

[73] Assignee: RCA Corporation, New York, N.Y.

[22] Filed: Sept. 17, 1976

[21] Appl. No.: 724,221

[52] U.S. Cl. .............................. 252/299; 252/408; 260/463; 260/465 D; 260/471 R; 260/473 R
[51] Int. Cl.² ..................... C09K 3/34; G02F 1/13; C07C 121/46; C07C 121/75; C07C 79/44; C07C 79/46
[58] Field of Search ........................... 252/299, 408; 350/160 LC; 260/463, 465 D, 471 R, 473 R

[56] References Cited

UNITED STATES PATENTS

| | | | |
|---|---|---|---|
| 3,915,883 | 10/1975 | Van Meter et al. | 252/299 |
| 3,923,857 | 12/1975 | Boller et al. | 252/299 |
| 3,925,237 | 12/1975 | Ross et al. | 252/299 |
| 3,925,238 | 12/1975 | Gavrilovic | 252/299 |
| 3,947,375 | 3/1976 | Gray et al. | 252/299 |
| 3,951,846 | 4/1976 | Gavrilovic | 252/299 |
| 3,952,046 | 4/1976 | Scherrer et al. | 252/299 |
| 3,954,653 | 5/1976 | Yamazaki | 252/299 |

*Primary Examiner*—Richard E. Schafer
*Assistant Examiner*—T. S. Gron

*Attorney, Agent, or Firm*—H. Christoffersen; Birgit E. Morris

[57] ABSTRACT

Liquid crystal compounds of the formula

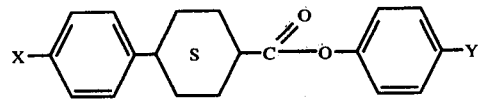

wherein X can be an alkoxy (RO-), an acyloxy

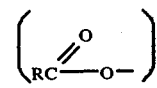

or an alkylcarbonato

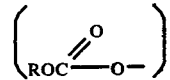

group wherein R is an alkyl group having up to 10 carbon atoms and Y is a nitro or cyano group, having positive dielectric anisotropy and are useful in electro-optic devices which comprise a thin liquid crystal layer between two closely spaced parallel electrodes.

8 Claims, 1 Drawing Figure

U.S. Patent     June 14, 1977     4,029,595
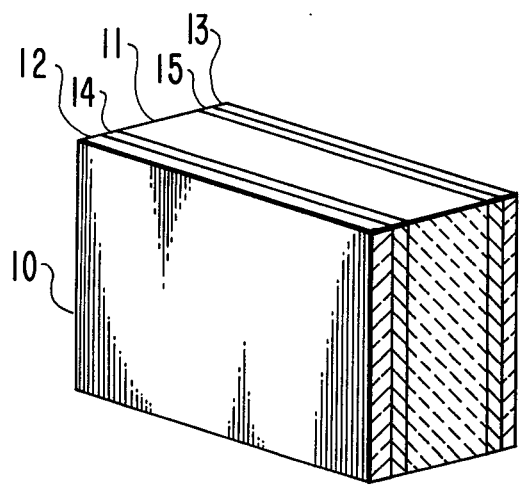

NOVEL LIQUID CRYSTAL COMPOUNDS AND ELECTRO-OPTIC DEVICES INCORPORATING THEM

This invention relates to novel liquid crystal compounds and to electro-optic devices including them. More particularly, this invention relates to nematic liquid crystal compounds having positive dielectric anisotropy and to field effect liquid crystal cells.

BACKGROUND OF THE INVENTION

Liquid crystal or mesomorphic compositions are of increasing interest in a variety of electro-optic display devices. Liquid crystal compositions are of particular interest for electrically controllable, flat panel displays such as watch faces, digital clocks, calculator displays, numeric displays for instruments and the like. An electro-optic device, e.g. a liquid crystal cell, comprises a layer of a liquid crystal composition between two closely-spaced parallel electrodes, at least one of which is transparent. In a preferred embodiment, the electrodes comprise glass plates having a transparent, conductive film thereon, as of tin oxide or indium oxide, suitably patterned for the desired display. When the electrode plates are connected to a source of voltage, an electric field is generated in the liquid crystal composition.

Field effect liquid crystal devices contain nematic compounds or mixtures of liquid crystal compounds having positive dielectric anisotropy. The electrode plates have been treated so that the liquid crystal molecules align themselves in a particular direction, usually parallel, to the plane of the plates. When an electric field is applied, the positive dielectric anisotropy of the molecules causes them to realign themselves in a direction parallel to the applied field and perpendicular to the plates. The change in alignment is made visible using a polarizer and an analyzer on either side of the cell. Field effect liquid crystal cells have the advantages of lower threshold voltages and wider viewing angle than other electro-optic devices such as dynamic scattering cells, and they have good contrast and long lifetimes.

Several positive anisotropy liquid crystal compounds having carboxylate linkages are known. For example, U.S. Pat. No. 3,925,237 to Ross et al. discloses positive liquid crystal compounds of the formula

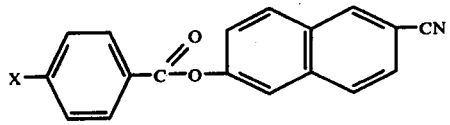

wherein X can be alkyl, alkoxy, acyloxy or alkylcarbonato and the alkyl groups have 1 to 10 carbon atoms.

U.S. Pat. No. 3,925,238 to Gavrilovic discloses positive liquid crystal compounds of the formula

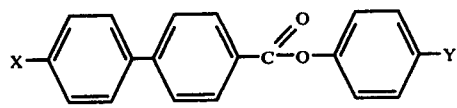

wherein X can be alkyl, alkoxy, acyloxy or alkycarbonato wherein the alkyl groups have 1 to 10 carbon atoms, and Y is cyano or nitro.

U.S. Pat. No. 3,951,846 to Gavrilovic discloses positive liquid crystal compounds of the formula

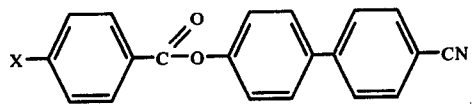

wherein X can be hydrogen, alkyl, alkoxy, acyloxy or alkylcarbonato wherein the alkyl groups have 1 to 10 carbon atoms.

Copending application of Gavrilovic, Ser. No. 696,904 filed June 17, 1976, discloses compounds of the formula

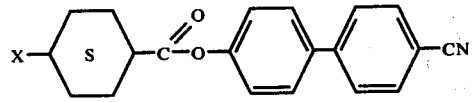

wherein X is alkoxy, acyloxy or alkycarbonato and the alkyl groups have 1 to 10 carbon atoms.

Each mesomorphic compound has a particular temperature range in which it is an ordered liquid, ranging from the solid to nematic liquid crystal melting point, up to the temperature range useful in electro-optic cells. Although, as is known, wide variations in useful temperature ranges can be effected by employing mixtures of known liquid crystal compounds that are compatible with each other, no single liquid crystal compound or mixture of compounds now known can satisfy all of the useful temperature ranges that are desired. The particular mesomorphic temperature range for each compound, or even whether a compound will be mesomorphic or not, is on the whole unpredictable. Thus, new liquid crystal compounds which have different useful temperature ranges are being sought to satisfy various temperature requirements for which the liquid crystal cells will be employed.

SUMMARY OF THE INVENTION

It has been discovered that certain liquid crystal compounds derived from 4-(p-substituted phenyl) cyclohexanecarboxylic acids have positive dielectric anisotropy and broad mesomorphic temperature ranges useful in field effect liquid crystal cells.

BRIEF DESCRIPTION OF THE DRAWING

The FIGURE is a cross-sectional perspective view of an electro-optic device embodying the invention.

DETAILED DESCRIPTION OF THE INVENTION

The novel liquid crystal compounds have the formula

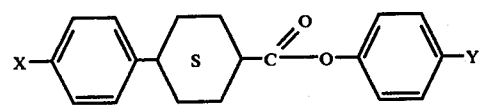

wherein X can be an alkoxy (RO-), an acyloxy

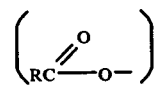

or an alkylcarbonato

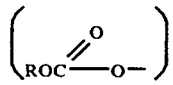

group wherein R is an alkyl group having up to 10 carbon atoms and Y is a nitro or cyano group. These compounds can be employed in electrooptic devices, alone, in admixture with each other, or in admixture with other liquid crystal compounds to broaden the useful temperature range or to vary the response time of the device.

The present compounds can be prepared by reacting 4-(substitued phenyl)cyclohexanecarbonyl chlorides with para-cyano- or para-nitrophenol using conventional techniques. The resultant liquid crystal compounds can be purified by conventional means, as by recrystallization, chromotography and the like.

Referring to the FIGURE, a liquid crystal cell 10 comprises a layer of a liquid crystal composition 11 between a front transparent glass support plate 12 and a back glass support plate 13. The front glass support plate 12 is coated on the inside surface thereof with a transparent conductive layer 14 which can be of tin oxide, to form one electrode. The back support plate 13 is also provided on the inside surface thereof with a conductive layer 15 to form the other electrode. If light is to be transmitted through the cell, the back electrode 15 and the back support plate 13 are also transparent and made of the same material as the front support plate 12 and front electrode 14. If the liquid crystal cell is to reflect light, the back electrode 15 can be made reflective, e.g., coated with aluminum. As is known, additional compounds such as wetting agents, aligning agents and the like can be added to the liquid crystal composition to improve the optical or electrical performance of the cell. In operation, the electrodes 14 and 15 are connected to a source of voltage (not shown). By suitable patterning of the transparent conductive layers the electro-optic devices described above can be incorporated into various displays, such as electronic clocks, watches, advertising displays, numeric indicators and the like.

The invention will be further illustrated by the following examples but the invention is not meant to be limited to the details disclosed therein. In the examples parts are by weight unless otherwise noted.

The mesomorphic transition temperatures of the compounds prepared in the examples were determined using a Thomas-Hoover melting point apparatus, a differential scanning calorimeter and a polarizing hot stage microscope in conventional manner.

EXAMPLE 1

Preparation of p-cyanophenyl-4-(p-butylcarbonatophenyl)cyclohexanecarboxylate

Part A

A mixture of 50 parts by volume of hot (125° C) isoamyl alcohol and 20 parts of sodium was stirred while adding a solution of 5 parts of 4-(p-methoxyphenyl)benzoic acid in 500 parts by volume of boiling isoamyl alcohol. After 15 minutes at 130° C, another 20 parts of sodium were added Stirring was continued at 140° C for 40 minutes, when an additional 30 parts of sodium and 150 parts by volume of hot isoamyl alcohol were added. The reaction mixture was stirred under reflux for 50 minutes or more and quenched with 1,000 parts of water. The mixture was acidified by slowly adding dilute sulfuric acid. The isoamyl alcohol was removed by steam distillation and the precipitated product separated by filtration. The product was purified by subliming at 200° C/0.1 mm Hg and recrystallizing from methanol.

A yield of 3.5 parts (68.6%) of 4-(p-methoxyphenyl)cyclohexanecarboxylic acid was obtained having a melting point of 215°–217° C. This compound is monotropic and has an isotropic to nematic transition temperature of 214.5° C.

Part B

The product as obtained in Part A was refluxed in 40 parts of acetic acid and 12 parts by volume of 48% hydrobromic acid for 5 hours. The acetic acid was removed by steam distillation. After cooling, the crude product was filtered and recrystallized from ethanol.

A yield of 1.7 parts (51.7%) of 4-(p-hydroxyphenyl)-cyclohexanecarboxylic acid was obtained having a melting point of 248°–250° C with partial decomposition.

Part C

A solution of 0.75 part of the product obtained in Part B was prepared by stirring in a solution of 0.272 part of sodium hydroxide in 7 parts of water at 5° C. Normal-butylchloroformate (0.465 part) was added and the mixture stirred for 30 minutes at 0°–5° C. Ten parts of water were added and the mixture acidified with hydrochloric acid. The precipitated product was filtered and recrystallized from isopropyl alcohol.

A yield of 0.9 part (82.6%) of 4-(p-butylcarbonatophenyl)cyclohexanecarboxylic acid was obtained having a melting point of 210°–215° C.

Part D

The product of Part C was refluxed in 15 parts by volume of thionyl chloride for 6 hours. Excess thionyl chloride was removed under vacuum to give 0.8 part of 4-(p-butylcarbonatophenyl)cyclohexanecarbonyl chloride.

Part E

The product of Part D, 0.3 part of p-cyanophenol, 10 parts by volume of benzene and 1 part by volume of pyridine were stirred and refluxed for 1 hour. The filtered solution was washed first with dilute hydrochloric acid and then with saturated aqueous sodium chloride and dried over anhydrous magnesium sulfate. The solvent was removed under vacuum and the solid product purified by chromotography through a silica gel column using benzene as the solvent. The solid product was further purified by recrystallizing first from isopropyl alcohol and then from cyclohexane.

A yield of 0.5 part (50.5%) of trans-p-cyanophenyl-4-(p-butylcarbonatophenyl)cyclohexanecarboxylate was obtained having the formula

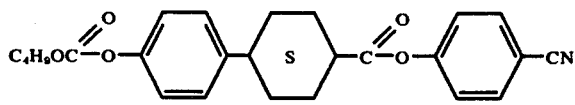

This compound had a crystal to nematic transition temperature of 107°–108° C and a nematic to isotropic liquid transition temperature of 214° C.

EXAMPLE 2

Preparation of p-nitrophenyl-4-(p-hexanoyloxyphenyl)cyclohexanecarboxylate

The procedure of Example 1 Part E was followed except substituting as the carbonyl chloride compound 4-(p-hexanoyloxyphenyl)cyclohexanecarbonyl chloride and p-nitrophenol instead of p-cyanophenol.

The product, trans-p-nitrophenyl-4-(p-hexanoyloxyphenyl)cyclohexanecarboxylate has the formula

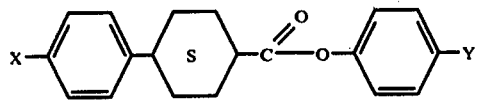

a crystal to nematic transition temperature of 76°–77° C and a nematic to isotropic liquid transition temperature of 181.5° C.

We claim:
1. An electro-optic cell comprising a liquid crystal layer between two electrodes wherein said liquid crystal includes a compound of the formula

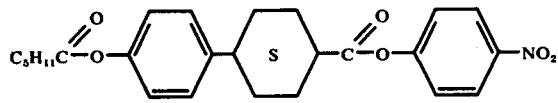

wherein X can be an alkoxy (RO—), acyloxy

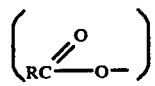

or alkylcarbonato

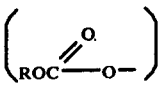

group wherein R is an alkyl group having 1–10 carbon atoms and Y is a nitro or cyano group.

2. An electro-optic cell according to claim 1 wherein both electrodes are transparent.

3. A liquid crystal compound having the formula

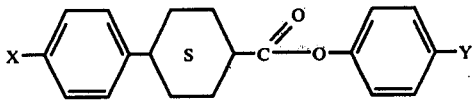

wherein X can be an alkoxy (RO—), acyloxy

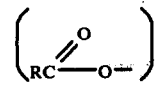

or alkylcarbonato

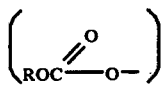

group wherein R is an alkyl group having 1–10 carbon atoms and Y is a nitro or cyano group.

4. A compound according to claim 3 wherein Y is a cyano group.

5. A compound according to claim 3 wherein X is the alkylcarbonato

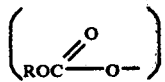

group.

6. A compound according to claim 4 wherein X is butylcarbonato.

7. A compound according to claim 3 wherein X is the acyloxy

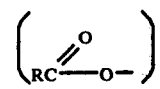

group.

8. A compound according to claim 3 wherein X is hexanoyloxy and Y is a nitro group.

* * * * *